(12) United States Patent
Brown et al.

(10) Patent No.: US 6,256,439 B1
(45) Date of Patent: Jul. 3, 2001

(54) LUBRICANT FOR CENTRAL CORE FIBER OPTIC CABLE HAVING STRANDED RIBBONS

(75) Inventors: Robert J. Brown, Buford; Jim Jenqtsong Sheu, Dunwoody, both of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/320,205

(22) Filed: May 26, 1999

Related U.S. Application Data

(63) Continuation-in-part of application No. 09/179,721, filed on Oct. 21, 1998.

(51) Int. Cl.[7] ................................................. G02B 6/44
(52) U.S. Cl. ............................................ 385/114; 385/110
(58) Field of Search ................................... 385/110, 114, 385/134; 508/110; 73/54.01

(56) References Cited

U.S. PATENT DOCUMENTS

| | | | |
|---|---|---|---|
| 4,078,853 | 3/1978 | Kempf et al. | 350/96.23 |
| 4,826,278 | 5/1989 | Gartside, III et al. | 350/96.23 |
| 4,840,454 * | 6/1989 | Mayr | 350/96.23 |
| 4,844,575 | 7/1989 | Kinard et al. | 350/96.23 |
| 5,082,348 | 1/1992 | Gartside, III et al. | 385/111 |
| 5,109,457 | 4/1992 | Panuska et al. | 385/102 |
| 5,187,763 * | 2/1993 | Tu | 385/100 |
| 5,285,513 * | 2/1994 | Kaufman et al. | 385/109 |
| 5,348,586 * | 9/1994 | Temple, Jr. et al. | 118/405 |
| 5,621,838 * | 4/1997 | Nomura et al. | 385/100 |
| 5,621,841 | 4/1997 | Field | 385/113 |
| 5,836,298 | 11/1998 | Grady | 126/506 |
| 5,905,833 * | 5/1999 | Sheu | 385/109 |

* cited by examiner

Primary Examiner—Hemang Sanghavi
Assistant Examiner—Omar Rojas
(74) Attorney, Agent, or Firm—Thomas, Kayden, Horstemeyer & Risley, LLP

(57) ABSTRACT

A family of lubricants for use in fabricating optical fiber cables having stacked optical fiber ribbons is disclosed. Each of the lubricants, is characterized by a surface tension less than 34 dynes per centimeter, a contact angle of less than 44 degrees and a viscosity appropriate for the cabling application.

25 Claims, 7 Drawing Sheets

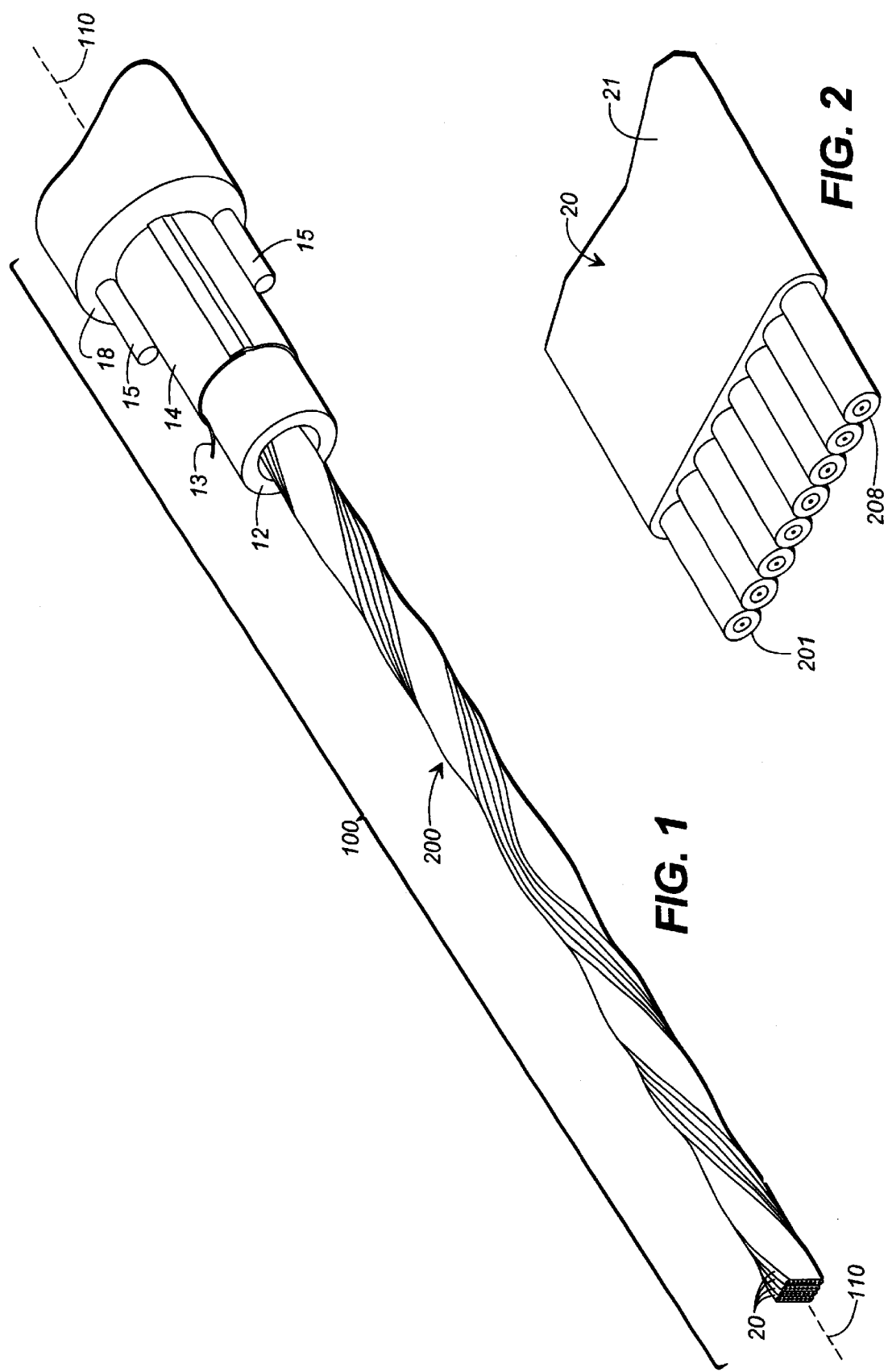

WETTING OF PRESENT INVENTION

BEADING

COMPETE WETTING

| TEMP(C) | VISCOSITY (cps) TYPE E OIL | VISCOSITY (cps) TYPE A OIL | VISCOSITY (cps) TYPE B OIL | VISCOSITY (cps) TYPE C OIL | VISCOSITY (cps) SHF 1001 | VISCOSITY (cps) TYPE S OIL | VISCOSITY (cps) TYPE F OIL | VISCOSITY (cps) TYPE G OIL | VISCOSITY (cps) TYPE H OIL |
|---|---|---|---|---|---|---|---|---|---|
| 23  | 148.75 | 168.5 | 884   | 132.5 | 3610  | 96.4 | 589   | 364  | 1055 |
| 33  | 88.3   | 89.8  | 475   | 77.6  | 1830  | 60.5 | 323.5 | 207  | 353  |
| 40  | 64.1   |       |       | 55.9  | 1180  | 43.1 | 224   | 142  | 211  |
| 45  |        | 46.9  | 256   |       |       |      |       |      |      |
| 60  | 32.1   | 25.4  | 125.5 | 25.1  | 407   | 20.8 | 89.3  | 58.9 | 100  |
| 80  | 20.5   | 14.3  | 57    | 13.7  | 107.8 | 11.4 | 41.9  | 28.6 | 46.1 |
| 100 | 16.8   | 7.6   | 31    | 8.2   | 88    | 7.3  | 23.2  | 16.6 | 25.1 |
| 120 | 14.9   | 5.7   | 18.4  | 5.6   | 49.6  |      | 14.3  | 10.5 | 19.2 |
| 150 | 8.1    | 3.6   | 10.1  |       | 25.1  |      | 8.2   | 6.2  | 13.8 |

TEMPERATURE ACCURACY: ±0.5% OF THE TEMPERATURE SET POINT

| COMPOSITION | NOMINAL KINEMATIC VISCOSITY cSt (centi-stroke) @ 100 C | AVERAGE SURFACE TENSION CAHN DYNAMIC CONTACT ANGLE ANALYZER (Dynes/cm) @ 20 C | AVERAGE CONTACT ANGLE ON MATRIX MATERIAL @ 20 C DEGREE | VISCOSITY cps @ 23 C ATS |
|---|---|---|---|---|
| DISTILLED WATER | | 72.39 | 57.3 | |
| TYPE A OIL | 98%KAYDOL+2%IRGANOX 1076 | 8 | 32.45 | 38.07 | 168.5 |
| TYPE B OIL | 98% SHF404+2%IRGANOX 1076 | 39 | 33.66 | 30.04 | 884 |
| TYPE C | 98% SHF101+2%IRGANOX 1076 | 10.1 | 30.63 | 35.2 | 132.5 |
| TYPE E OIL | 22.5% SHF404+75.5%SHF82+2%IRGANOX 1076 | 10 | 30.77 | 35.94 | 148.75 |
| TYPE F OIL | 78.4% SHF404+19.6%SHF101+2%IRGANOX 1076 | 30 | 33.18 | 40.6 | 589 |
| TYPE G OIL | 55.8% SHF404+42.2%SHF101+2%IRGANOX 1076 | 20 | 32.47 | 43.6 | 364 |
| TYPE S | 98% SYNFLUID+2%IRGANOX 1076 | 9 | 31.23 | 37.1 | 98.4 |
| | | | <34 | <44 | |

LUBRICANT FOR CENTRAL CORE FIBER OPTIC CABLE HAVING STRANDED RIBBONS

RELATED APPLICATIONS

This application is a continuation-in-part of U.S. patent application Ser. No. 09/179,721 of R. J. Brown et al., filed Oct. 21, 1998.

TECHNICAL FIELD

The present invention relates to a communication cable design having a central core containing a plurality of fiber optic ribbons, and to lubricants therefor.

BACKGROUND OF THE INVENTION

In the manufacture of optical communication cables, two design types are most frequently employed that are generally referred to as "central-core" and "loose-tube" designs. In the central-core design, a number of optical fibers are contained within a tube, which is located at the center of the cable. This cable typically includes strength members that are positioned between the central core and an outer plastic jacket. By comparison, loose-tube cable designs typically include a number of relatively small tubes that are positioned around a central strength member, and each tube encloses a number of optical fibers. In the loose-tube cable design, the fiber-containing tubes are longitudinally stranded around the central member, which is to say that the tubes are rotated around the central member along the length of the cable. An example of such a loose-tube cable design is disclosed in U.S. Pat. No. 5,621,841.

From a manufacturing standpoint, the central-core design is advantageous because it allows the various components of the cable to be assembled into their ultimate cable form in a single step rather than two or three steps as in the loose tube design. From an efficiency standpoint, optical fiber ribbon (i.e., a planar array of optical fibers that are bonded together as a unit) is advantageous because many ribbons can be stacked on top of each other within a small space. Accordingly, central-core cables having stacked optical fiber ribbons are highly desirable.

Longitudinal stranding is used in the optical cable industry to avoid subjecting individual fibers to undue tensile or compressive stress that may occur when the cable is bent. Such stress not only modifies the transmission characteristics of a fiber but also leads to breakage in extreme situations. In this industry, two types of longitudinal stranding are know: "continuous" and "S-Z." Continuous stranding is a process in which one or more strands of material (e.g., optical fibers) are helically rotated in a single direction along the longitudinal axis of the cable; whereas in S-Z stranding, the direction of rotation periodically reverses. S-Z stranding is preferred because it achieves the benefits of longitudinal stranding without the need for heavy machinery to lift and rotate large reels of strand material and it removes limits on the length of component materials. (Heretofore, stranding a stack of optical fiber ribbons in a central-core cable has been undesirable because transmission loss is significantly increased. This increase is frequently referred to as "cabling" loss since it is wholly attributable to the installation of transmission media [i.e. the ribbon stack] in a cable.) Furthermore, S-Z stranding has been difficult to achieve because twisted material tends to unwind at the point of reversal owing to inherent physical forces (restorative forces) that are created when a relatively stiff body is twiste—much like a torsion spring. This difficulty is exacerbated when the stiffness is increased, such as by stacking and bonding fiber ribbons together in a single unit.

In the formation of stacked ribbons, there is a tendency for the ribbons to stick together during sheathing which can create microbending, resulting in increased losses in the cable. The addition of suitable lubricant between the ribbons has resulted in substantially eliminating such losses. However, it has been found that many lubricants, e.g. oils, can present additional problems, stemming from characteristics of the lubricant such as viscosity, surface tension, contact angle, and surface wetting. These characteristics can lead to inadequate lubricating of the ribbons with a consequent increase in losses.

SUMMARY OF THE INVENTION

The foregoing problems have been overcome by a cable having two or more optical fiber ribbons, which are stacked in an array and disposed within a tube that is positioned at the center of the cable. A lubricant is applied between adjacent ribbons of the stack in order to hold the ribbons together as a unit and to facilitate sliding movement between the ribbons. The stack of ribbons is longitudinally (i.e., twisted) along the length of the cable.

The lubricant of the present invention is, for example, a polyalphaolefin oil or a mineral oil which, in accordance with the invention, has a surface tension of below 34 dynes per centimeter and a contact angle, which will be discussed hereinafter, of less than 44 degrees. The contact angle is a measure of beading of the oil and hence, indirectly, a measure of the wetting properties of the oil. The surface tension is also a factor in the wetting of the ribbon surface, and a relatively low surface tension produces more complete wetting. In addition, a cable containing stacked ribbons is generally filled with a filling material (water blocking viscous gel) which, itself, functions as a lubricant. A surface tension of the oil below 34 dynes per centimeter with a relatively low viscosity permits the filling material to be drawn into the space between ribbons, thereby complementing the lubrication supplied by the oil, and the bonding effect between ribbons is substantially unimpaired.

The lubricating oils of the invention, therefore, function to hold the stack of ribbons together, to permit sliding of the ribbons relative to each other, to reduce transmission losses in the cable, and to insure, at least at some extent, the distribution of the water blocking gel within the stack. Also, the stack of ribbons is twisted in one direction for a first predetermined distance, and then twisted in the opposite direction for a second predetermined distance. These distances are preferably equal to each other.

BRIEF DESCRIPTION OF THE DRAWINGS

Other features of the present invention will be more readily understood from the following detailed description of specific embodiments thereof when read in conjunction with the accompany drawings, in which:

FIG. 1 is a perspective view of a central-core optical cable in accordance with the present invention, FIG. 2 is a perspective view of an optical fiber ribbon showing a group of coated glass fibers bonded together with a matrix material;

FIG. 7 is a table of viscosity data used to plot the graph FIG. 6; and

FIG. 8 is a table illustrating the measured characteristics of seven lubricating oils and distill water.

DETAILED DESCRIPTION

Figure 3A:
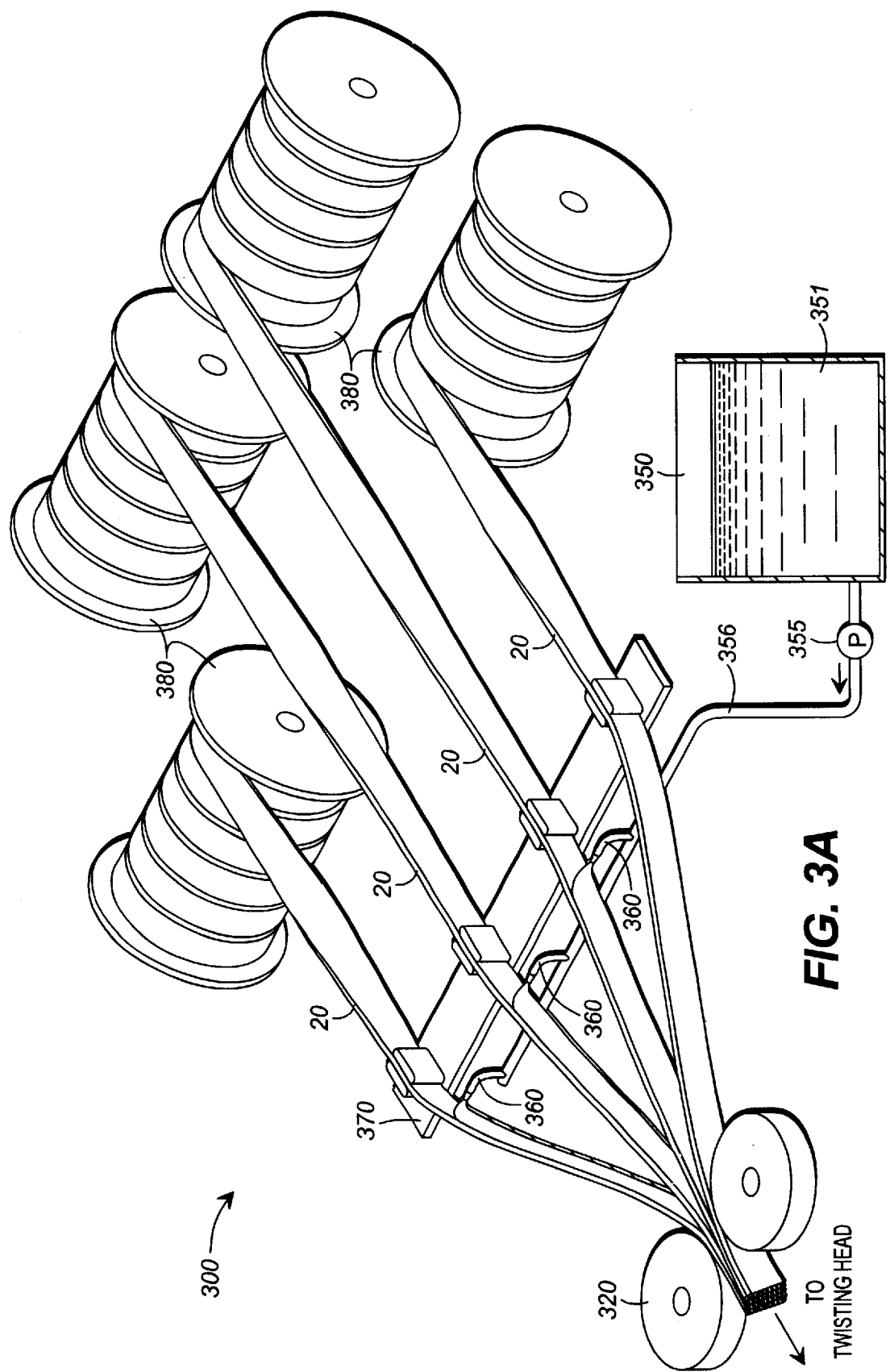
FIGS. 3A and 3B provide a detailed view of an apparatus that is suitable for imparting a controlled helical twist on a stack of optical ribbons, particularly when the twist reverses direction periodically.

FIG. 1 discloses a central-core cable 100 having a stack 200 of light-guide fiber ribbons 20—20, with each ribbon comprising a number of light-transmitting optical fibers aligned in a planar array. Ribbon stack 200 is disposed within a tubular member 12 that is made from a polymeric material such as polypropylene, polyvinyl chloride or polyethylene, and surrounded by a sheath system. A water-blocking tape 14 wraps around the tubular member 12 and is used to prevent water that has entered the cable 100 from propagating along the direction of the longitudinal axis 110—110 of the cable. Such a tape is shown in U.S. Pat. No. 4,867,526, which is hereby incorporated by reference. Surrounding the water-blocking tape 14 is a plastic jacket 18 that, illustratively, is made from a polyethylene material. A trip cord 13, made of Kevlar® yarn, facilitates removal of this sheath system. Additionally, strength members 15—15 may be included within cable 100 in order to provide tensile strength and preclude compressive (shrinkage) stresses, applied to the plastic jacket 18, from being transferred to the optical fibers within the ribbon stack 200.

Desirably, the strength members 15—15 are an integral part of the jacket 18 and function together as a unit. The strength members 15—15 are characterized by a tensile modulus (e.g., 10,000,000–30,000,000 psi) that is higher than the tensile modulus of the fibers in order to minimize the strain on the fibers in the load range of interest. The strength members 15—15 may be stainless steel wires; however, the other materials, metallic or nonmetallic, such as graphite or aramid rods or Kevlar yarn can be used. Also, the strength members can be composite structures comprising any of a number of high modulus materials.

The specific design of the sheath system is not critical to the novel aspects of the present invention. However, for the sake of completeness, various forms of acceptable sheath designs and constructions are provided in the following commonly assigned U.S. Pat. Nos. 4,078,853; 4,826,278; 4,844,575; 5,082,348 and 5,109,457, which are incorporated herein by reference.

As stated above with regard to the sheath system, the particular design and construction of optical ribbon 20 is not critical to the implementation of the present invention. Nevertheless, one acceptable ribbon design is shown in FIG. 2 and described in U.S. Pat. No. 4,900,126, which is hereby incorporated by reference. Briefly, optical fiber ribbon 20 comprises a group of coated glass fibers 201-208 that are held together with an ultraviolet (UV)-curable matrix bonding material 21. The group of optical fibers are disposed in a coplanar parallel array, and while only eight (8) fibers are shown, such arrays frequently comprise twelve or more individual fibers. The matrix material 21 fills the interstices, bonds together the optical fibers, and extends to the outside boundary of the ribbon. Known UV-curable matrix materials 21 comprise a resin, a diluent and a photoinitiator. The resin may include a diethylenic-terminated resin synthesized from a reaction of a hydroxy-terminated alkyl acrylate with the reaction product of a polyester of polyether polyol of molecular weight of 1000 to 6000 with an aliphatic or aromatic diisocyanate, or a diethylenic-terminated resin synthesized from the reaction of glycidyl acrylate with a carboxylic-terminated polymer or polyether of molecular weight 1000 to 6000. The diluent may comprise monofunctional or multifunctional acrylic acid esters having a molecular weight of 100 to 1000 or N-vinylpyrrolidinone. For the photoinitiator, the composition may include ketonic compounds such as diethoxyacetophenone, acetophenone, benzophenone, benzoin, anthraquinone, and benzil dimethyl ketal. In a typical composition, the bonding matrix may include a resin (50–90%), diluents (5–40%), and a photo-initiator (1–10%). All percentages are by weight unless otherwise noted. Other bonding matrices may include a methacrylate, an UV-curing epoxide or an unsaturated polyester.

Figure 3B:
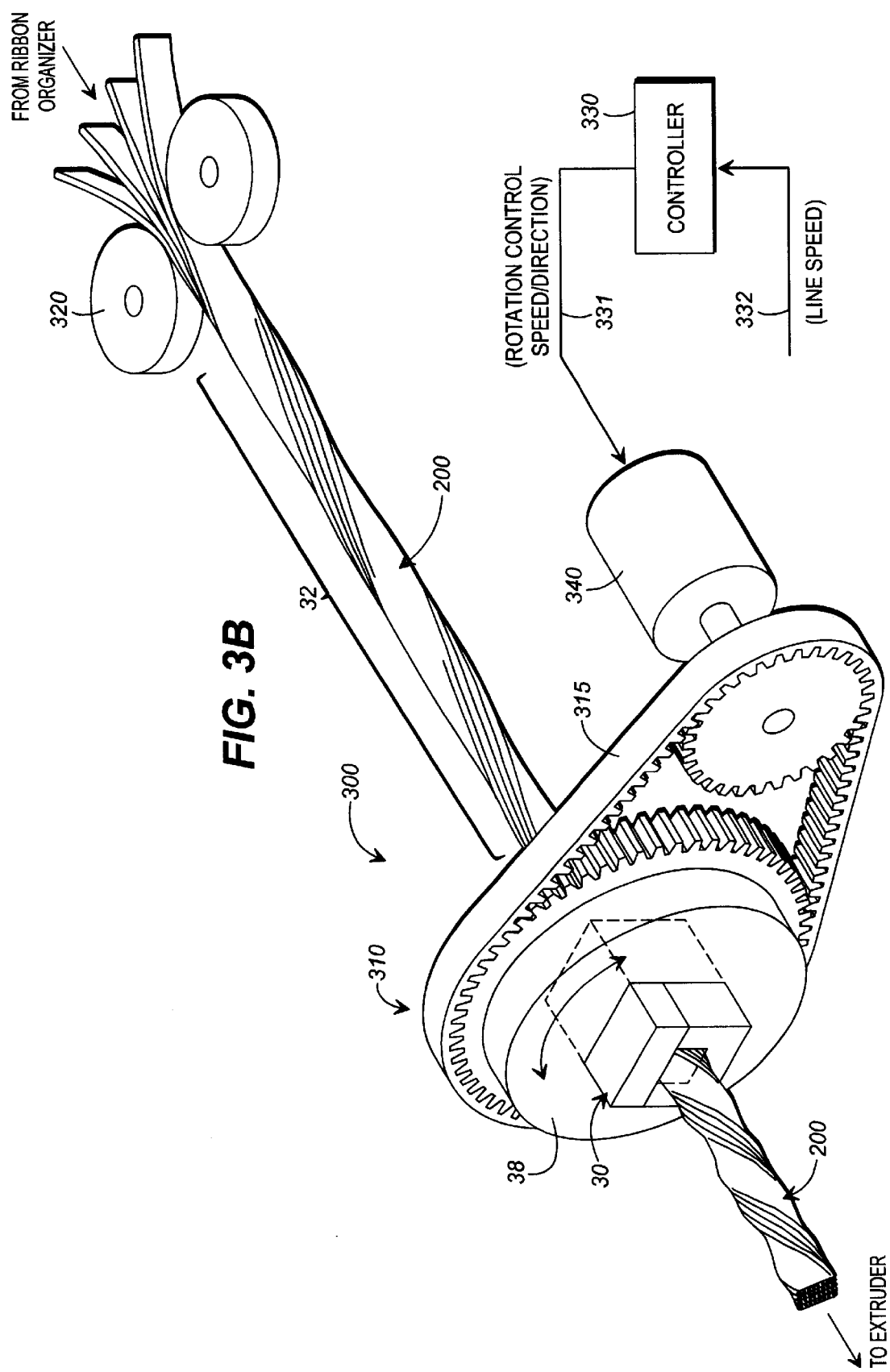

FIGS. 3A and 3B disclose the operation of an S-Z stranding apparatus 300 for optical ribbons in accordance with the present invention. The operation begins by dispensing or "paying off" a collection of ribbons 20 from payoff reels 380—380. The ribbons 20 pass through a guide 370 in a side-by-side arrangement with the ribbon width oriented up and down (i.e., individual fibers of each ribbon are vertically aligned), and the ribbons 20 are in close proximity (one inch or less) to each other. While maintaining this arrangement, the collection of optical ribbons are exposed to lubricant dispensers 360—360, which coat the flat side(s) of the selected ribbons 20—20 with a lubricant 351 in order to provide lubrication and adhesion between adjacent ribbons. The lubricant-dispensing device may simply be a pump 355 that is connected by tubing 356 between a lubricant-containing reservoir 350 and the dispensers 360—360. The ribbons are then brought together in a stacked configuration with two flat-bottomed sheaves or guides 320. At this point, the ribbons are pressed together in a manner that allows the surface tension of the lubricant 351 to "bond" the ribbons together in a single stack 200 to take on the physical properties of a single unit.

Figure 4:
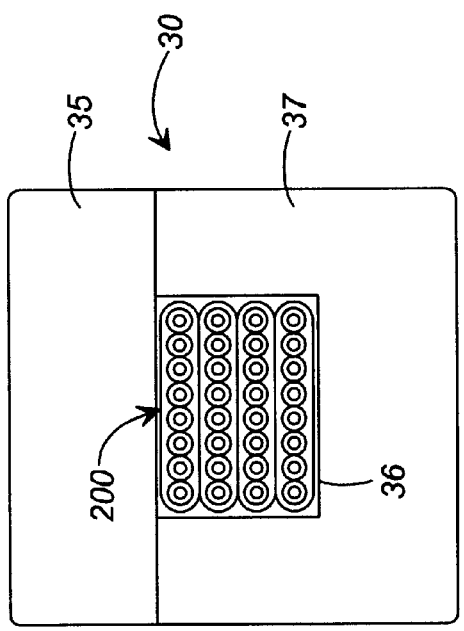
FIG. 4 is a view of a twisting guide used in the apparatus of FIG. 3B.

Once established, the stack 200 enters linear accumulator 32 (FIG. 3B), which may be noting more than a longitudinal section of the manufacturing line where the ribbon stack 200 is essentially unencumbered. Ribbon stack 200 traverses the linear accumulator 32 and enters a twisting assembly 310 that includes a twisting guide 30 that is mounted in a motorized head 38. The motorized head 38 is driven by a ribbed belt 315 which, in turn, is driven by a motor 340. The twisting guide 30 is shown in greater detail in FIG. 4, and it comprises a two-piece assembly for capturing and holding a moving ribbon stack 200. Twisting guide 30 includes top and bottom portions 35, 37 that fit together and provide an opening 36, which is tapered at the ribbon entrance end. The cross section of the opening 36 is slightly larger than the cross section of the ribbon stack 200. Moreover, the geometric center of the opening 36 is positioned on the axis of rotation of the ribbon stack 200 so that the ribbon stack does not wobble from side to side during stranding.

The twisting guide 30 rotates at a rate that is proportional to the line speed of the ribbon stack in order to create the desired lay (i.e., twist pattern). "Lay" is generally characterized in terms of the number of complete rotations per unit length and the rotational direction. For example, a 2-foot lay length means that the ribbon stack makes one complete revolution every 2 feet of cable length. As the twisting guide 30 rotates, a twist is put into the ribbon stack 200 that progresses toward the end of the manufacturing line away from payoff reels 380—380 shown in FIG. 3A. However, as twisting guide 30 rotates, not only is the downstream portion of the ribbon stack rotated, but the upstream portion (within accumulator 32) of the ribbon stack is also rotated. The twisting guide 30 is rotated in a first direction until the desired number of twists are introduced into the ribbon stack 200. As this occurs, the ribbons tack 200 within the linear accumulator 32 gets tighter and tighter until the twisting guide 30 reverses its rotational direction. It should be noted that numerous techniques may be used to determine when to reverse direction. For example, the specific number of twists may be counted, a helix angle detector may be used to evaluate the ribbon positions, or load cells may be employed to sense the toque of the ribbon stack itself.

The controller 300 is preferably arranged to reverse the rotational direction of a motor 340, which drives the twisting guide 30, after a predetermined number of twists. Information regarding line speed is fed into the controller 330 on input line 332, and signals which control the direction and speed of rotation are fed to the motor 340 on output line 331. As a result of this reversal, the motorized head 38 begins taking out twists from the ribbon stack 200 in the linear accumulator 32 and causing the portion of the ribbons tack 200 progressing down the manufacturing line away from the payoff reels 380—380 to have a longitudinal stranding in a rotational direction opposite from that of a portion of ribbon stack 200 passing through the twisting guide 30 before its rotational direction reverses.

This procedure continues until the twists are all removed and there is no lay in the linear accumulator 32; but the rotation of the ribbon stack continues, without interruption, until an equal number of twists (in the opposition direction) are imparted onto the ribbon stack 200 within the accumulator. Twisting guide 30 then changes rotational direction and the process repeats until a desired length of cable is manufactured.

It is known throughout the industry that if one side of a ribbon array is tighter than the other, then the array will veer toward that side, which is to say that a "bias" exists. However, if there are too few twists between reversals, then a bias will be created unless the twist pattern is precisely controlled. And while the twisting guide 30 may change direction at a precise point, the twist pattern does not. Rather, the restorative force of the twisted ribbon stack 200 creates a transition region where the twist pattern partially unwinds in the region of twist reversal. Accordingly, it has been empirically determined from measurements and tests performed under typical manufacturing parameters (e.g. a manufacturing line over about 100 feet long, running at between 25–200 feet per minute), that the effective lay approaches the targeted lay at about 15 to 20 feet from the center of the reversal. In one particular embodiment of the patent application Ser. No. 09/179,721, the length between reversals is at least 30 feet. For a 2-foot lay length, this requires a minimum of 15 twists in each direction.

After the ribbon stack 200 is stranded, it advances through an extruder (not shown) which cause a plastic material to be extruded around the core to form the core tube 12 (see FIG. 1). Beyond the extruder, the core tube containing the stranded ribbon stack is passed through a cooling trough (not shown), which is exposed to a negative pressure. This causes the core tube to expand away from the ribbon stack 200 as it cools. As a result, a loose fitting tube is formed about the ribbon stack that permits relative movement between the ribbon stack and the tube. Thereafter, ripcord 13, water-blocking tape 14, and strength members 15—15 are introduced, as well as a filling gel, if desired. Tension is maintained on the strength members 15—15 as they enter a second extruder (not shown) that aids in holding them in their precise positions as an outer jacket 18 (preferably polyethylene) is extruded thereover.

Because it is desirable to protect the hair-thin optical fibers from tensile stresses applied to the cable, the fibers need to be longer than the cable itself. This is achieved with what is known as A "big wheel" (such as shown in U.S. Pat. No. 4,446,686), which stretches the cable between itself and a belt capstan in a straight line such that the fiber is installed in a stretched cable. After the cable leaves the "big wheel" after making several wraps, the sheath relaxes and the result is that excess fiber length is created with respect to cable length.

Figure 5C:
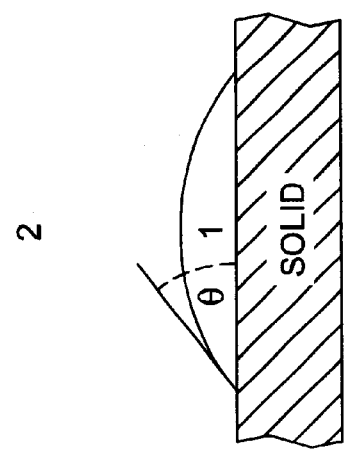
FIG. 5 is a diagram illustrating three different degrees of wetting by a lubricant.
Figure 5B:
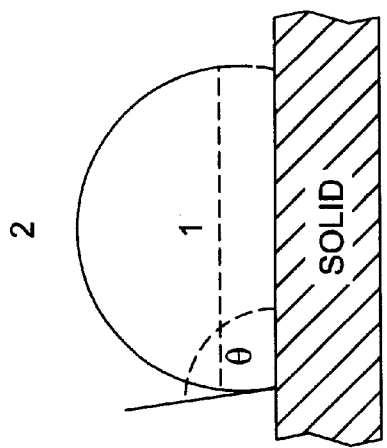
Figure 5A:
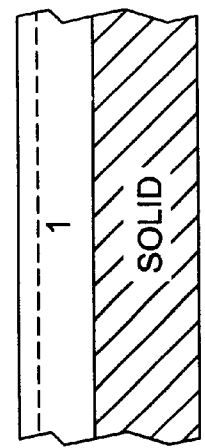

In accordance with the present invention, the lubricant 351 of the present invention is an oil which meets the criteria of being characterized by a surface tension of less than 34 dynes per centimeter and a contact angle of less than 44 degrees. In FIG. 5 there are shown three different degrees of wetting, i.e. complete wetting (a), beading (b), and wetting (c) that is greater than (b) but less than (a). These are three-phase equilibrium diagrams between the solid (ribbon), liquid phase (1) and immiscible phase (2) air). It can be seen in (b) that the surface tension is great enough to cause beading, forming a contact angle $\theta$ between a tangent to the bead at the point of contact with the surface and the surface. As can be seen, angle $\theta$ is greater than 90°. In (c) the surface tension of the oil is much less, and as a result, the contact angle $\theta$ is considerably less than that in (b). Thus, the contact angle is an indirect indication of the wetting. In accordance with the invention, the contact angle $\theta$ is less than 44° to produce satisfactory wetting. When the surface tension of the oil is below 34 dynes per centimeter, the tendency to bead is materially reduced, thus leading to superior wetting.

Figure 6:
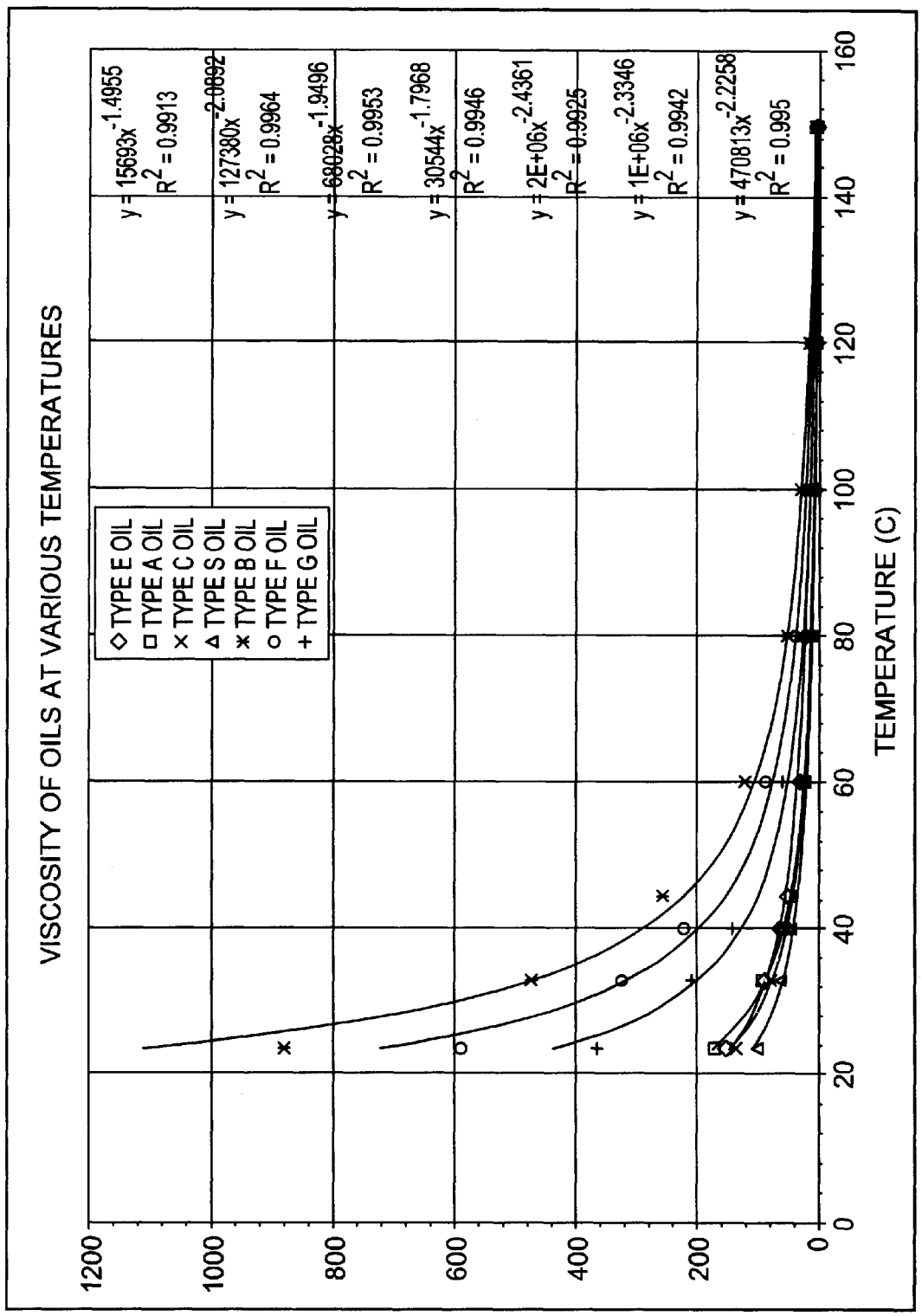
FIG. 6 is a graph illustrating temperature dependence of viscosity for seven different lubricating oils.

In addition, to surface tension, and contact angle, a third characteristic of oils is the viscosity thereof at different temperatures. The viscosity of some oils is more sensitive to temperature changes than that of others, and, at room temperature, these oils have higher viscosities. They will stay on the outside of ribbon stacks and between the ribbon stacks during the S-Z stranding. The cabling steps immediately follow the oiling are either application of filling material and/or extrusion of the central core. These oils will come in contact with either filling compound or core tube material at much higher temperatures. As can be seen from FIGS. 6 and 7, the viscosities for Type B, F, and G oils decrease quickly to lower levels from at room temperature to about 60° C. and above. Viscosities of oils at these low levels help in mixing with and bring the filling material into the ribbon stacks. As mentioned before, coverage of oil or filling material is desired for minimizing the microbending optical loss of fibers in ribbons. In a regular (non S-Z) ribbon cabling process, an oil which is less sensitive the temperature change may be preferable. For example, Type A, C, E, and S oils have low viscosities at room temperature suitable for the oiling device for the operation. Viscosities of these oils stay at about the same levels such that they will also help in mixing with and bring the filling material into the ribbon stacks when in contact with the filling material at much higher temperatures.

FIG. 8 is a chart showing the characteristics of several different oil mixtures such as average surface tension, average contact angle on the ribbon matrix surface, and viscosities. For reference, the properties for distilled water are also listed. As an example, Type E oil comprises 22.5% by weight of SHF-402 (or 404) polyalphaolefin oil, 75.5% by weight of SHF-82 polyalphaolefin oil, and 2% by weight of IRGANOX® 1076 antioxidant. SHF-402 (or 404) and SHF-82 are commercially available from Mobil Chemical Company and the antioxidant (stabilizer) is commercially available from the Ciba-Geigy Company. This oil has a viscosity between 54 and 82 centistrokes at 40° C. and a viscosity between 8 and 12 centistrokes at 100° C., when measured in accordance with the method of ASTM D-445. This oil was selected to be compatible with the oils used in a filling material, e.g., gel, that may, optionally, be included within the core tube 12 (see FIG. 1). It can be seen in FIG. 8 that the surface tension and contact angle for type E oil are well within the limits of the present invention, thus making type E oil a preferred embodiment of the invention. Type A oil, which comprises 98% Kaydol® mineral oil and 2% Iragnox 1076® is likewise, a suitable choice. Kaydol® is a commercially available product of Witco Corporation.

Type F oil, which comprises 78.4% of SHF 404, 19.6% of SHF 101 and 2% by weight of IRGANOX® 1076 antioxidant has a higher viscosity at room temperature. Type F oil tends to stay on the ribbon surface during S-Z stranding and hence is a preferred embodiment of the invention. Other oils, as can be seen from the chart (FIG. 8) also satisfy the criteria of the present invention, although, the viscosity characteristics are important depending the applications. In all cases, the antioxidant is optional. SHF 101 is also available from Mobil Chemical Company. Oronite Synfluid is available from Chevron Chemical Company. Whatever oil or oil mixtures are used, the viscosity should preferably be within the ranges of 4 to 110 centistroke at 100° C. Within these ranges, the lubricant performs as set forth in the foregoing.

Although various particular embodiments of the present invention have been shown and described, modifications are possible within the spirit and scope of the invention. Thus, lubricating materials other than those specifically disclosed may be used, provided they meet the specific criteria as to characteristics as herein set forth. Examples of such oils are synthetic hydrocarbon oils such as polyalkane oils, e.g., polypropylene oil or polybutene oil; polyalkane glycols such as polypropylene glycols, polyethylene glycols or polybutylene glycols; chlorinated paraffin oil; polymerized esters; polysilanes and polysiloxanes such as silicone oil; petroleum crude oil based oil, treated or untreated such as 150 solvent neutral, mineral oil or white oil; and/or triglyceride—based vegetable oil such as castrol oil. It is also within the scope of the invention that various mixtures of these oils may be used. In all cases, the material used should satisfy the criteria of the invention as hereinbefore set forth.

What is claimed is:

1. For use in a fiber optic cable which comprises a plurality of optical fiber ribbons disposed within a core tube, the ribbons being positioned on top of each other in a rectangular stack;
    a lubricant between adjacent ribbons in the stack to bind the ribbons together and to reduce friction between adjacent ribbons in the stack and to reduce the optical loss of fibers in the ribbons, said lubricant comprising an oil based material having a surface tension of less than 34 dynes per centimeter and a contact angle of less than 44 degrees.

2. A lubricant as claimed in claim 1 wherein said lubricant has a viscosity in the range of 4 to 110 centistrokes at 100° C.

3. A lubricant as claimed in claim 1 wherein said lubricant has a viscosity between 18 and 1350 centistrokes at 40° C.

4. A lubricant as claimed in claim 1 comprising polyalphaolefin oils.

5. A lubricant as claimed in claim 4 and further including a stabilizer.

6. A lubricant as claimed in claim 1 comprising a mineral oil.

7. A lubricant as claimed in claim 6 and further including a stabilizer.

8. A lubricant as claimed in claim 1 comprising a mixture of polyalphaolefin, and mineral oil.

9. A lubricant as claimed in claim 8 and further including a stabilizer.

10. A lubricant as claimed in claim 1 comprising a synthetic hydrocarbon oil.

11. A lubricant as claimed in claim 1 comprising a polyalkane glycol oil.

12. A lubricant as claimed in claim 1 comprising chlorinated paraffin oil.

13. A lubricant as claimed in claim 1 comprising a polymerized ester oil.

14. A lubricant as claimed in claim 1 comprising a polysilane oil.

15. A lubricant as claimed in claim 1 comprising a petroleum based oil.

16. A lubricant as claimed in claim 1 comprising a triglyceride-based vegetable oil.

17. For use in a fiber optic cable which comprises a plurality of optical fiber ribbons disposed within a core tube, the ribbons being positioned on top of each other in a rectangular stack;
    a lubricant between adjacent ribbons in the stack to bind the ribbons together and to reduce friction between adjacent ribbons in the stack and to reduce the optical loss of fibers in the ribbons, said lubricant comprising an oil mixture having a surface tension of less than 34 dynes per centimeter and a contact angle of less than 44 degrees;
    said mixture having at least one principal component from the group of polyalphaolefin oil, mineral oil, synthetic hydrocarbon oil, polyalkane glycol, chlorinated paraffin oil, polymerized ester, polysilane oil, polysiloxane oil, petroleum based oil, and triglyceride-based vegetable oil.

18. A lubricant as claimed in claim 17 wherein said oil mixture further includes a stabilizer.

19. An optical fiber cable comprising:
    a central core comprising a plurality of optical fiber ribbons disposed within a core tube, each of said ribbons comprising a planar array of optical fibers bound together as a unit;
    said ribbons being positioned on top of each other forming a rectangular stack;
    a lubricant between adjacent ribbons of the stack, said lubricant comprising an oil base material having a surface tension of less than 34 dynes per centimeter and a contact angle of less than 44 degrees.

20. An optical fiber cable as claimed in claim 19 wherein said lubricant has a viscosity in the range of 4 to 110 centistrokes at 100° C.

21. An optical fiber cable as claimed in claim 19 wherein said lubricant has a viscosity between 18 and 1350 centistrokes at 40° C.

22. An optical fiber cable as claimed in claim 19 wherein said lubricant comprise a mixture of polyalphaolefin oils.

23. An optical fiber cable as claimed in claim 19 wherein said lubricant comprises a mineral oil.

24. An optical fiber cable as claimed in claim 19 wherein said lubricant comprises a mixture of polyalphaolefin, mineral oil and a stabilizer.

25. An optical fiber cable as claimed in claim 19 and further comprising a filling gel within said core.

* * * * *